Aug. 14, 1951     H. PULS     2,563,866
BAKING MACHINE
Filed Oct. 15, 1947     6 Sheets-Sheet 1

INVENTOR
*Herman Puls*
BY
*Dean Fairbank & Hirsch*
ATTORNEYS

Aug. 14, 1951   H. PULS   2,563,866
BAKING MACHINE
Filed Oct. 15, 1947   6 Sheets-Sheet 2

INVENTOR
Herman Puls
BY
Dean Fairbank & Hirsch
ATTORNEYS

Patented Aug. 14, 1951

2,563,866

UNITED STATES PATENT OFFICE 2,563,866

BAKING MACHINE

Herman Puls, New York, N. Y.

Application October 15, 1947, Serial No. 780,093

15 Claims. (Cl. 107—4)

The present invention relates to automatic machinery for the quantity production of tubes of pastry and is particularly concerned with, though not limited to, a machine that automatically forms, bakes and discharges the baked tubes.

It is among the objects of the invention to provide an automatic baking machine for forming and baking tubes of pastry, which machine is compact and rugged in construction, which functions with a minimum number of operating parts, none of which is delicate or apt to become out of order, which machine is capable of continuous operation for long periods without attention, and the working parts of which are readily accessible for maintenance and repair and the cost of upkeep of which is low.

According to the invention, a plurality of pastry tube molds are mounted on a support therefor. A plurality of operating stations are provided to act upon the interior of successive molds to form the pastry tube therein and after the molds are heated in a suitable oven, to lift the baked pastry tubes therefrom. Means are provided to effect relative step-by-step movement between said operating stations and said molds, said operating stations only functioning after each of such stepping movements when there is no relative movement between the operating stations and the mold. In addition to the primary operations at the operating stations, a plurality of auxiliary operations are performed on the exterior of the molds during the course of the relative step-by-step movement between the operating stations and the molds, by suitable operating instrumentalities fixed with respect to the stations, acting upon the molds in sequence and serving to imprison and lock the contents of each of the molds therein preparatory to baking and after baking to release the mold content and expose the pastry tube, so that it may be lifted from the mold.

In the specific embodiment of the machine herein chosen to illustrate my invention, the molds are identical and comprise separable hinged segments extending radially of a mounting table therefor. Through a transmission from a main drive, the table is rotated in a step-by-step movement so that each mold thereon will successively pause at a sequence of operating stations, each of which is actuated by a continuously rotating cam, driven through a transmission from the main drive.

The operations performed at and between these stations include the charging of the open mold with a predetermined amount of dough, the closing and locking of the mold, the introduction of a plunger rod or core into the charged mold to form a tube therein, the locking of the plunger rod in the mold, and after baking in an oven, the unlocking of the mold, the unlocking and removal of the plunger rod or core therefrom, the opening of the mold, and the introduction into the baked pastry tube of a lifting pin, the raising of such pin with its encompassing pastry tube, to remove the same from the mold, and the withdrawal of the pin to discharge the pastry tube from the machine.

In the accompanying drawings in which are shown one or more of various possible embodiments of the several features of the invention, Fig. 6 is a view similar to Fig. 5, taken along line 6—6 of Fig. 2.

While the various cams, gears and sprocket wheels for operating the constituent elements of the machine may be arranged in timed relation in any of a multiplicity of possible ways, to be driven by a common motor m desirably on the base of the machine, a particularly desirable arrangement is shown in the drawings.

The general construction of the machine will first be described and then under appropriate titles will be described the component structural parts of the preferred specific embodiment shown herein whereby automatic operation is achieved.

General construction

Referring now to the drawings, the machine comprises a bed 21 supported by a conventional frame 22, which frame also supports a base 23 affixed thereto beneath bed 21.

Journalled in a ball bearing 24 which extends through an opening 25 in bed 21 and which is affixed to the bed by bolts 26, is a vertical shaft 27, the lower end 28 of which is journalled in a ball bearing 29 affixed to base 23 by bolts 30.

In order to prevent shaft 27 from sliding through bearing 29, a collar 31 is provided, affixed to the lower end 28 of the shaft 27 by a set screw 32 and having a downwardly extending rim 33 which is seated on the inner race 34 of the bearing 29.

A circular table 37 having a hub 38 is positioned on the upper end 35 of shaft 27, and securely affixed thereto by means of a set screw 36 extending through said hub. The lower rim 39 of hub 38 is seated on a disk 41 which desirably has a downturned rim 42 which is seated on the inner race 43 of bearing 24.

An intermittent drive mechanism is provided to effect step-by-step rotation of table 37. This mechanism comprises a vertical drive shaft 44 journalled at its upper end 45 in a ball bearing 46 under and affixed to the bed 21 of the machine by a bracket arm 47. The lower end 48 of drive shaft 44 is journalled in a ball bearing 49 affixed to base 23 by bolts 51.

To restrain drive shaft 44 from axially downward movement in its bearings 46 and 49, a collar 52 is provided, affixed to the lower end 48 of the drive shaft 44 by a set screw 53 and having a downwardly extending rim 54 which is seated on the inner race 55 of bearing 49.

Affixed to the upper end 45 of drive shaft 44 which protrudes beyond bearing 46 is a disk 56 which forms part of a Geneva drive mechanism. Disk 56 has an upstanding pin 57 near the periphery thereof which coacts with the notched rim 58 of a drive plate 59 affixed to shaft 57 by a set screw 61. Illustratively, there are twenty-four notches 62 in rim 58 so that twenty-four complete rotations of disk 56 would be required for one complete rotation in intermittent 15 degree steps of shaft 27 to which plate 59 is affixed.

To rotate the drive shaft 44, a motor m is provided preferably mounted upon base 23 of the machine. The motor is connected by a shaft 63 to a reduction gear box 64 which, as it is itself conventional and forms per se no part of this invention, will not be described in detail. The reduction gears in gear box 64 rotate a bevel gear 65 which coacts with a corresponding bevel gear 66 affixed by set screw 67 to drive shaft 44 to rotate the latter.

Affixed to table 37 near the periphery thereof by screws 68 and equally spaced thereon are a plurality of support arms 69 illustratively twenty-four in number extending radially of and protruding as at 71 beyond the periphery of table 37. Each of the protruding ends 71 of radiating arms 69 has a mold 72 affixed thereto by screws 73. A heat insulating pad 74 preferably of asbestos is provided between arm 69 and table 37 to minimize the transfer of heat there-between.

The molds 72 herein, which are identical, each comprises a base 75 in the form of a substantially rectangular block which has a semi-circular depression 76 longitudinally of the upper face thereof, extending from one end 78 to a tapering point 77 near the opposite end of the block. Depression 76 is of greater depth at end 78 of the block to form a semi-circular seat 79 for a bearing bushing 81 of substantially the diameter of seat 79 and extending upwardly therefrom beyond the upper face of base 75, the bearing being securely affixed in its seat by screw 82 which passes through the base into a corresponding threaded opening in the bushing.

The cover 83 of the mold is substantially identical to base 75, corresponding parts having the same reference numerals primed, and is hinged to base 75 as at 70 along one side thereof.

In order to form a tube from the dough with which the mold is charged in the manner hereinafter described, a horizontal plunger rod or core 87 is provided for each of the molds. Each of the plunger rods is slidably mounted at one end in the corresponding one of a plurality of bearing openings 88 in upstanding rim 89 of circular hub 91 which rises from and is affixed to the center of table 37 by screws 92. The other end of each of the plunger rods is slidably mounted in bearing bushing 81 of its associated mold 72, the nose end 93 of each plunger rod being tapered to conform to the tapered end of depressions 76 and 76' in the base and cover of the mold respectively.

In order that the cover and base of the mold may be securely held together to keep the mold closed, a latch arm 96 is provided which is pivoted to the side wall 97 of base 75 as at 98 and is of such length as to have a portion protruding above the top of the cover 83 as at 99. The latch arm 96 also has integral therewith a hook 101 which, when latch arm 96 is pivoted to closed position, engages a stud 102 extending laterally from side wall 103 of cover 83 to lock the mold. A stop 104 extending laterally outward from side wall 97 of base 75 adjacent pivot 98 limits the opening movement of the latch arm.

To heat the molds 72, an oven 107, having an intake end and a discharge end, is provided which in the embodiment herein preferably comprises an arcuate gas pipe 108 affixed to the bed of the machine by brackets 109 and extending about the arc defined by the outer ends of the molds. The arcuate length of pipe 108 is such that at the required operating speed of the machine to give the maximum feasible output, it will give the correct period of heating without overbaking or underbaking the tube.

Extending radially inward from pipe 108 are a plurality of pairs of gas outlets 110, each pair forming a yoke. The pairs of outlets 110 are positioned along pipe 108 so as to be spaced from each other by a distance equal to that between the outer ends of consecutive molds. Thus after each intermittent movement of table 37 by the intermittent drive mechanism therefor, one of said pairs of outlets will be vertically aligned with an associated mold to straddle the same. The outlets each have a plurality of openings 111 therein, positioned so that the gas flame therefrom will play upon the top and bottom of the mold for equal distribution of heat thereto.

It is of course to be understood that other types of ovens could be used such as electric ovens, it being important only that the heat be distributed equally over the mold to provide even baking of the contents thereof.

Figures 7, 14:
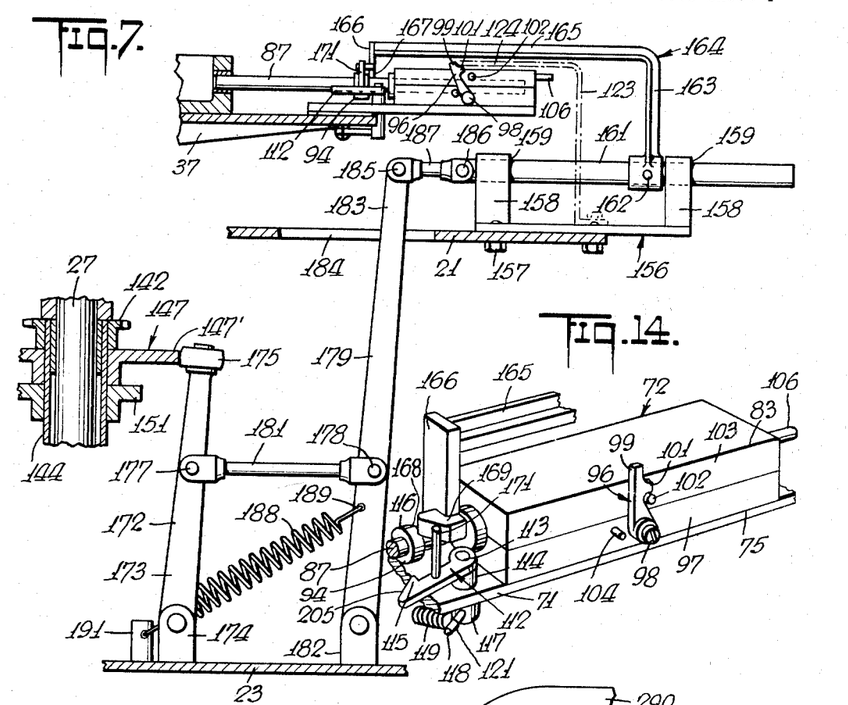
Fig. 7 is a view similar to Fig. 5, taken along line 7—7 of Fig. 2.
Fig. 14 is a perspective view on a larger scale showing the mold and plunger rod latch mechanism.

Means are provided securely to retain each of the plunger rods 87 in the mold to guard against expulsion of said rods from the molds under the expansion of the dough therein by the gases generated during the baking cycle. As shown in Fig. 14, this means may comprise a horizontal latch 112 affixed to the upper end of a pin 113 extending through and pivotally mounted in the bore of a hub 114 upstanding from each of the support arms 71.

Latch 112 has a hook 115 whereby the outer face 116 of a collar 94, affixed to plunger rod 87 by set screw 95, may be engaged to lock the plunger rod in the mold 72. The portion of pin 113 extending beneath support arms 71 has a collar 117 affixed thereto by means of a laterally extending pin 118 which extends through said collar and said pin 113. A coil spring 119 affixed at one end to said pin 118 as at 121 and anchored at its free end to the support arm 71, resiliently urges the hook portion 115 of the latch for engagement with collar 116.

In order that the baking of the tubes of pastry be automatically performed, a plurality of operating stations A, B, C, D and E are provided about the table 37. The operations performed at these stations include the charging of the mold M at station A the introduction of the plunger rod or mold core at station B, and after baking in the oven, the removal of the mold core at station D and the introduction into the pastry tube at station E of the lifting pin and the lifting operation of the latter.

In addition to the primary operations at stations A, B, D and E, a plurality of auxiliary operations are performed in the course of the stepping movement of each mold from station to station by suitable operating instrumentalities rising from bed 21.

Thus during the course of the stepping movement of the table from station A to station B, the open mold is first closed by engagement with a fixed member on the stationary bed and then locked by engagement with a fixed cam with a latch on the mold. During movement of the mold from station C to station D, the closed mold is unlocked by engagement of the latch thereof with a fixed cam on the stationary bed and during movement of the mold from station D to station E, the closed unlocked mold is opened by engagement with a fixed cam surface on the stationary bed.

The operations at the various stations A, B, D and E are performed in timed relation from a cam shaft driven from motor m. This cam shaft may be in the form of a sleeve 144, encompassing shaft 27 immediately below hub 59'. The cam shaft 144 is retained against sliding movement along said shaft 27 by resting upon a collar 145 affixed by a set screw 146 to said shaft. The cam shaft is driven through a transmission comprising a sprocket wheel 139 affixed to drive shaft 44 beneath bearing 46 by a set screw 141. An identical sprocket wheel 142 is affixed by a set screw 143, to cam shaft 144.

By means of a sprocket chain 147 encircling sprocket wheels 139 and 142, cam shaft 144 will be rotated one revolution for each revolution of drive shaft 44.

Affixed on cam shaft 144 are a plurality of cams including a plunger rod or core withdrawal cam 147 affixed beneath sprocket wheel 142 by set screw 148, and having a cam 149 on the upper face thereof to actuate the mold charging pump 269; a plunger rod or core insertion cam 151 affixed beneath cam 147 by set screw 152 and a cam 153 affixed beneath cam 151 by set screw 154 and having an additional cam 155 on the under face thereof, cams 153 and 155 actuating the pastry tube removal mechanism.

The operation at and between the individual station will now be set forth in detail under appropriate headings.

*Dough injection mechanism (station A—Figs. 2, 3 and 4)*

Figures 1, 4:
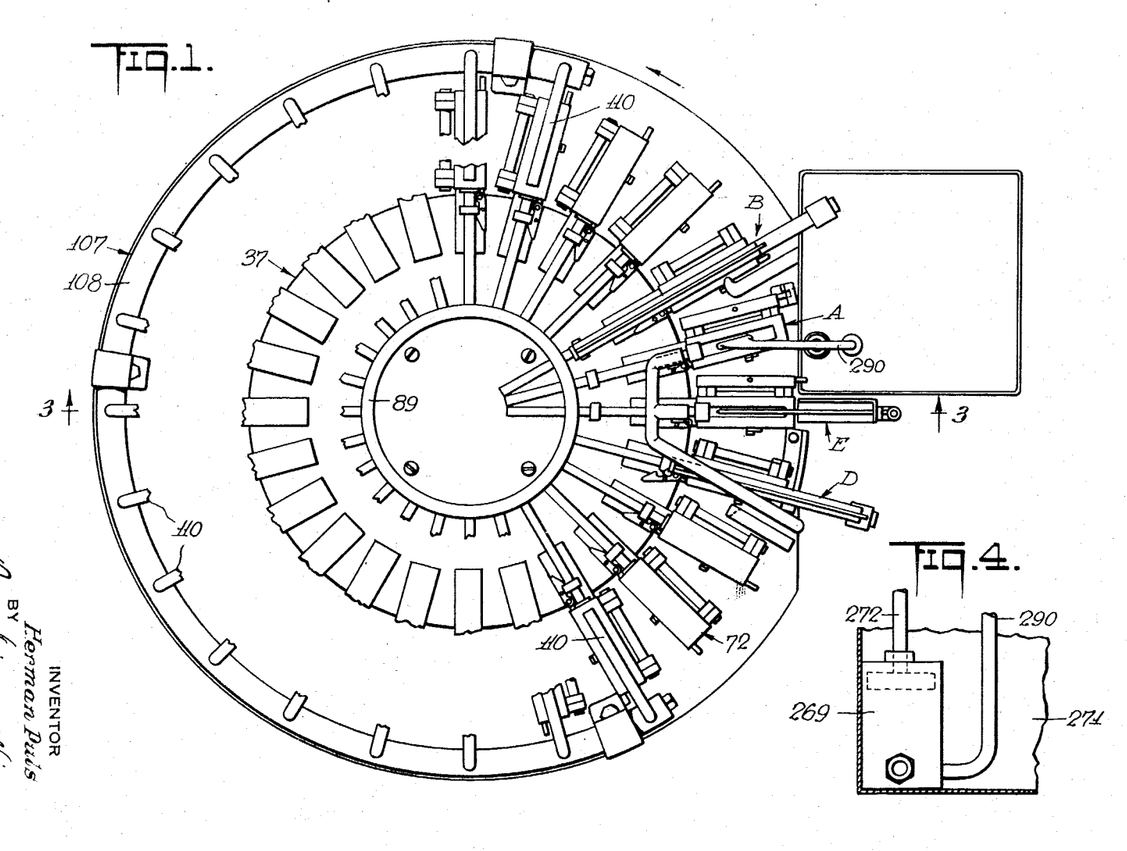
Fig. 1 is a top plan view of the machine with parts broken away.
Fig. 4 is a detail sectional view on a larger scale taken along line 4—4 of Fig. 2.
Figure 2:
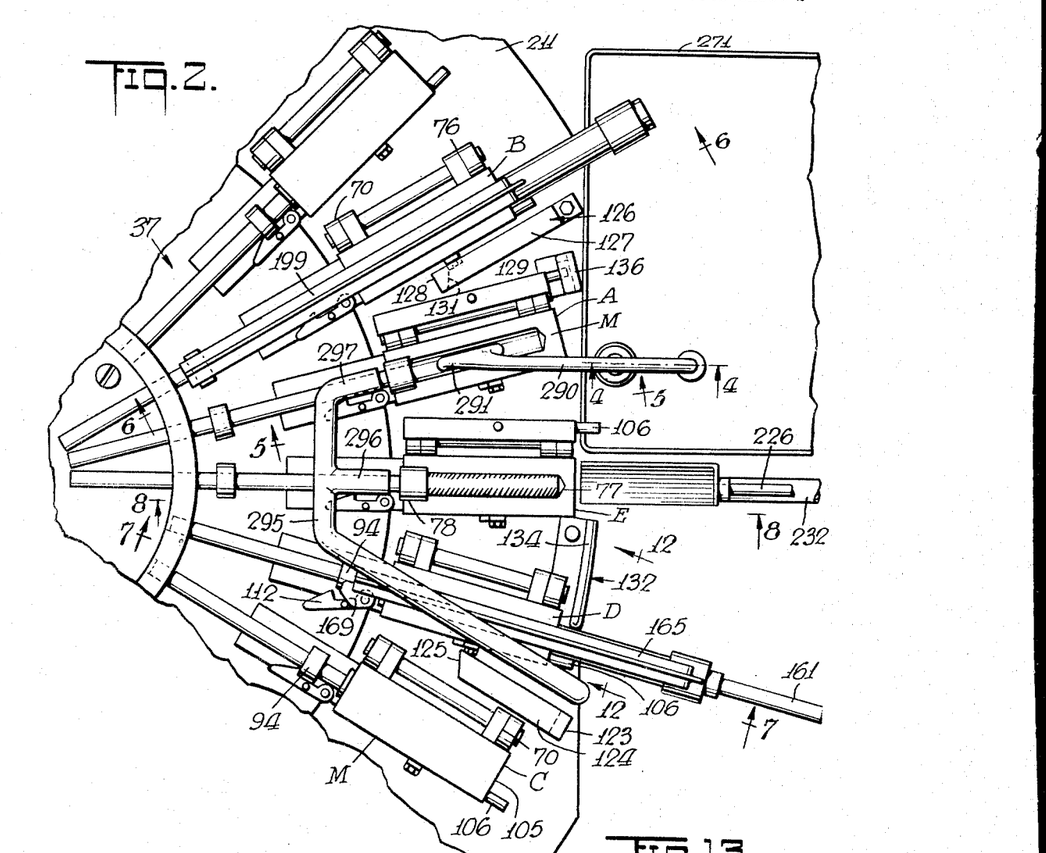
Fig. 2 is a fragmentary top plan view of the machine on a larger scale with the lifting pin out of the mold.
Figure 3:
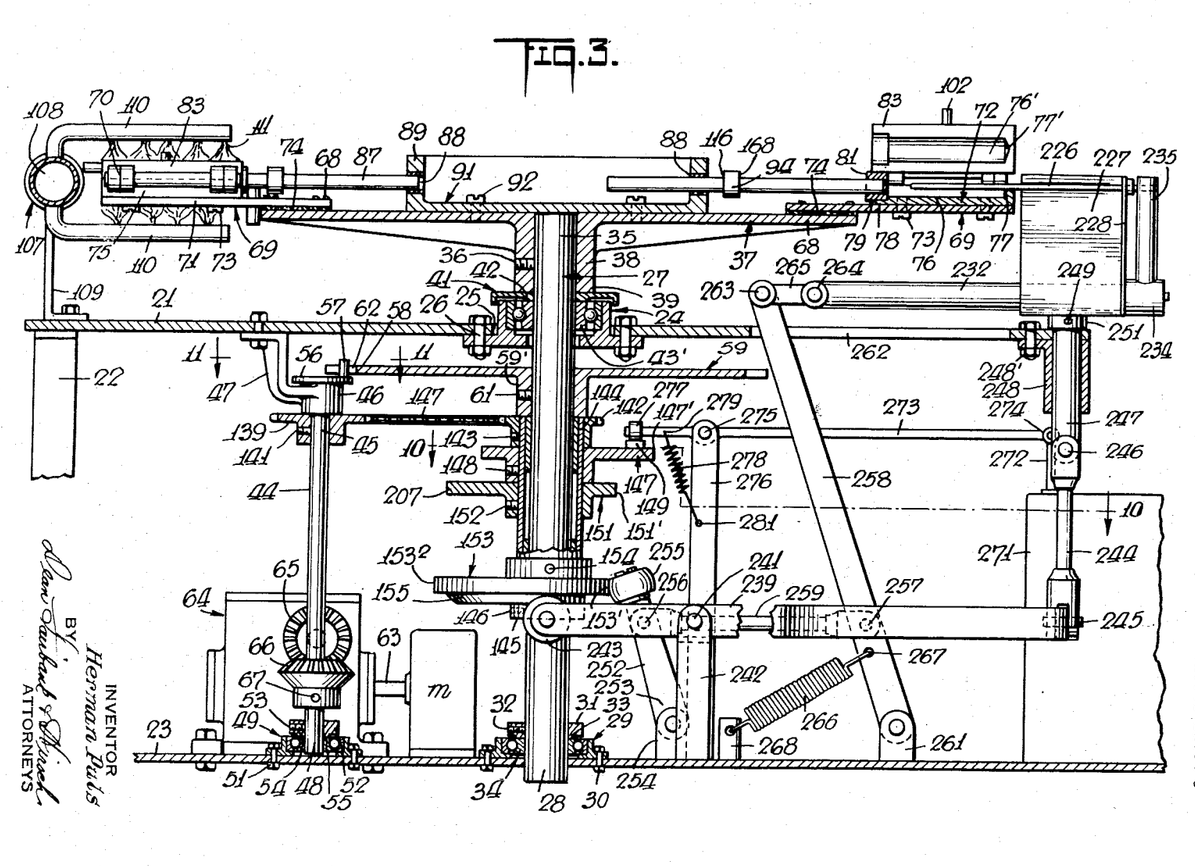
Fig. 3 is a view of the machine in longitudinal cross-section, taken along line 3—3 of Fig. 1.
Figure 5:
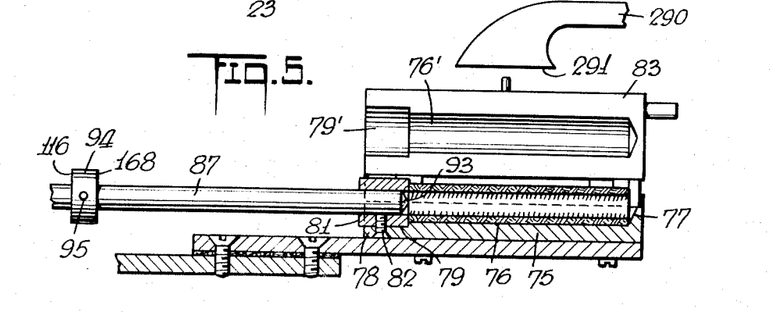
Fig. 5 is a view of the machine in longitudinal cross-section, taken along line 5—5 of Fig. 2.

To charge the molds with dough, a pump 269 is provided which as it is conventional in construction will not be described in detail. The pump is supplied with dough from a supply tank 271 which is positioned on the base 23 of the machine. The actuate the piston rod 272 of the pump 269, a lever 273 is pivotally affixed thereto at the end thereof as at 274. The lever is pivoted near its midsection as at 275 on a bracket 276 affixed to the base 23 of the machine. The free end of the lever has a roller 277 thereon to engage cam 149 on the upper surface of cam 147, thereby to pivot the lever and force piston rod 272 into pump 269. This action forces a charge of batter through outlet 290 and the fish-tail nozzle 291 thereof so that a strip of batter will be injected into the mold. To ensure that the piston rod 272 will be lifted from the pump to complete the suction stroke of the pump to recharge the latter for the next cycle, a coil spring 278 is provided affixed at its end to lever 273 as at 279, and at its free end to bracket 276 as at 281.

*Mold closing mechanism (Fig. 15)*

To close the cover of the mold after the latter has been charged, a bracket 136 is provided (see Figs 2 and 15), affixed at its lower end to the bed 21 and having an upright arm 137 with a laterally extending finger 138 preferably unitary therewith which is in the path of movement of pin 106 extending laterally outward from end wall 105 of the open mold cover, as the mold moves from station A to station B.

Figure 15:
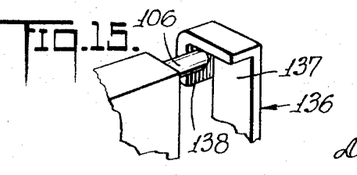
Fig. 15 is a fragmentary perspective view of the mold closing device.

As the pin abuts against finger 138, the cover will be pivoted about its hinge to closed position, the closed mold clearing finger 138.

*Mold locking mechanism (Fig. 6)*

To pivot latch arm 96 about its pivot 98 so that hook 101 thereof engages stud 102, an upright bracket 126 is provided affixed at its lower end to the bed 21 and having a laterally extending portion 127 extending inwardly over the molds. The end 128 of portion 127 is reversely bent to form a horizontal cam arm 129, the beveled end 131 of which lies in the path of end 99 of latch arm 96 when it is in unlocked position. Thus with the intermittent movement of table 37 and the molds thereon, from station A to station B, end 99 of latch arm 96 abuts against edge 131 and the latch arm will be cammed toward stud 102 so that hook 101 engages the latter, securely to lock the mold.

*Core insertion mechanism (station B—Figs. 2 and 6)*

As shown in Fig. 6, this mechanism comprises a bracket 192 affixed to the bed 21 by bolts 193. Rigid with and rising from the ends of said bracket 192 are bearing blocks 194, the bearing openings 195 therein extending radially of the table 37.

Slidably mounted in said bearing openings 195 so as to reciprocate therein is rod 196 having affixed thereto, between said bearing blocks 194 by a set screw 197, the upright portion 198 of a substantially L-shaped arm 199. The horizontal portion 201 of arm 199 extends radially inward over the molds 72 beyond bushings 81 thereof and has at its end a downwardly extending finger 202, the end 203 of which clears plunger rod 87 but is adapted to abut against the outer face 116 of collar 94 but is adapted to abut against the outer face 116 of collar 94 affixed to plunger rod 87, when rod 196 is moved, thereby to insert the plunger rod 87 into the mold.

As plunger rod 87 is moved into the mold, collar 94 will abut against cam surface 205 of latch 112, thereby carrying said latch away from collar 94, and when collar 94 has passed the cam surface 205, the latch will be snapped by spring 119 into locking position to lock the plunger rod in the mold.

To reciprocate rod 196, a transmission is provided actuated by cam 151. It is to be noted that the high portions 206 and 207 of cams 147 and 151, respectively, are 180 degrees apart so that when cam 147 is withdrawing a plunger rod from one of the molds, cam 151 will be inserting a plunger rod into another of the molds.

The transmission comprises an upright lever 207' pivoted at its lower end 208 to a bracket 209 which is affixed to base 23, and having a roller 211 at its upper end in engagement with cam 151. Lever 207' is connected to an upright lever 214 by means of a pitman 21, pivoted at its ends as at 212 and 213 to the respective levers. Lever 214 is pivoted at its lower end to a bracket 216 affixed to base 23 and its upper end 217 protrudes through a slot 218 in bed 21 and is pivotally connected to rod 196 by pitman 222 pivoted as at 219 and 221, respectively, to lever 214 and rod 196.

By means of coil spring 223 affixed at one end to lever 214 as at 224 and anchored to base 23 as at 225, roller 211 is maintained in constant engagement with cam 151 so that lever 207' follows the latter.

*Mold unlocking mechanism (Figs. 2 and 7)*

To pivot latch arm 96 about its pivot 98 so that hook 101 thereof will be released from stud 102, an upright bracket 123 is provided, affixed at its lower end to the bed 21 and having a laterally extending portion 124 lying in the same plane as the protruding end 99 of the latch arm 96. The free end of horizontal portion 124 has a beveled edge 125 which lies in the path of end 99 of latch arm 96. Thus as the latter is moved by the intermittent movement of table 37 and the molds thereon from station C to station D, and end 99 abuts against edge 125, latch arm 96 will be cammed away from stud 102 to release hook 101 therefrom.

*Plunger rod withdrawal assembly (station D—Figs. 2 and 7)*

As shown in Fig. 7, this mechanism substantially duplicates the mechanism previously described for inserting the plunger rod into the mold and comprises a bracket 156 affixed to the bed 21 by bolts 157. Rigid with said bracket 156 at each end thereof, respectively, is a bearing block 158, the bearing openings 159 therein extending radially of the table 37.

Slidably mounted in said bearing openings 159 so as to reciprocate therein is a rod 161 having affixed thereto between said bearing blocks 158 by a set screw 162, the upright portion 163 of a substantially L-shaped arm 164. The horizontal portion 165 of arm 164 extends radially inward over the molds 72 beyond bushings 81 thereof and has at its end a downwardly extending finger 166, the end 167 of which clears plunger rod 87 but is adapted to abut against the inner face 168 of collar 94 affixed to plunger rod 87 when rod 161 is moved, thereby to withdraw the plunger rod 87 from the mold.

Inasmuch as plunger rod 87 is locked in the mold by the coaction of hook 115 of latch 112 and collar 94, before plunger rod 87 can be withdrawn from the mold, hook 112 must first be released. To this end, finger 166 has a forwardly extending cam piece 169 preferably unitary therewith which, as the L-shaped arm 164 is moved inwardly by rod 161, will engage an upstanding pin 171 affixed to latch 112 to cam the latter away from collar 94 against the tension of coil spring 119, thereby disengaging the hook 115 therefrom. As the collar 94 is thus released by latch 112 before the finger 166 abuts against the inner face 168 of said collar 94, the plunger rod will thereupon be free to move out of the mold.

To reciprocate the rod 161, a transmission is provided, actuated by the cam 147. The transmission comprises an upright lever 172 pivoted at its lower end 173 to a bracket 174 affixed to base 23 and having a roller 175 at its upper end in engagement with the cam 147. Lever 172 is connected to an upright lever 179 by means of a pitman 181, pivoted at its ends as at 177 and 178 to the respective levers. Lever 179 is pivoted at its lower end to a bracket 182 affixed to base 23 and its upper end 183 protrudes through a slot 184 in bed 21 and is pivotally connected to rod 161 by pitman 187 pivoted as at 185 and 186 respectively, to lever 179 and rod 161.

By means of a coil spring 188 affixed at one end to lever 179 as at 189 and anchored to base 23 as at 191, roller 175 is maintained in constant engagement with cam 147, so that lever 172 will follow the latter.

*Mold opening mechanism (Figs. 12 and 13)*

Figures 12, 13:
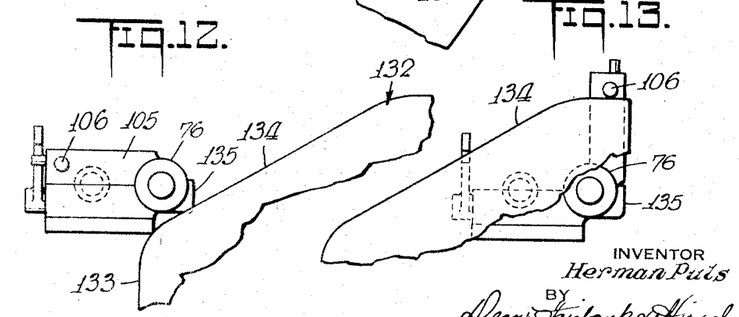
Fig. 12 is a detail sectional view taken along line 12—12 of Fig. 2, showing the mold in closed position.
Fig. 13 is a view similar to Fig. 12, showing the mold in open position.

To open the mold after it has been unlocked, a substantially L-shaped bracket 132 is provided (see Figs. 2, 12 and 13) affixed at its lower end to the bed 21 of the machine and having an upright portion 133 with an inclined cam surface 134 at the top thereof. Cam surface 134 is in the path of movement of pin 106 that protrudes from the end wall 105 of the mold cover. As shown in Figs. 12 and 13, as pin 106 rides up cam surface 134 as the mold moves from station D to station E, cover 83 will be pivoted upwardly about hinge 76, and as the cover passes the vertical position and pin 106 rides off cam surface 134, the weight of the cover against stop 135 (Fig. 13) will retain the mold in open position.

*Pastry tube removal mechanism (station E—Figs. 2, 3, 8 and 9)*

Figures 8, 11:
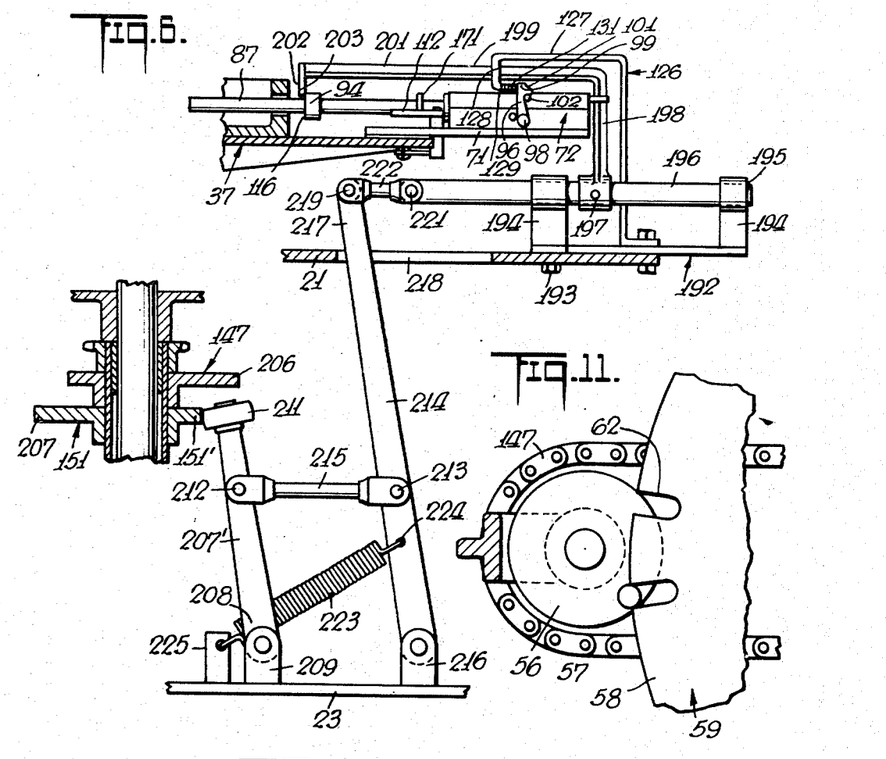
Fig. 8 is a view similar to Fig. 5, taken along line 8—8 of Fig. 2.
Fig. 11 is a detail transverse sectional view on a larger scale, taken along line 11—11 of Fig. 3.

In order to remove the baked tube 294 from the mold after plunger rod 87 has been removed therefrom and the mold has been opened, a horizontally and vertically reciprocable pick up pin 226 is provided, as shown in Figs. 3, 7 and 8.

Figures 8, 9, 16, 17:
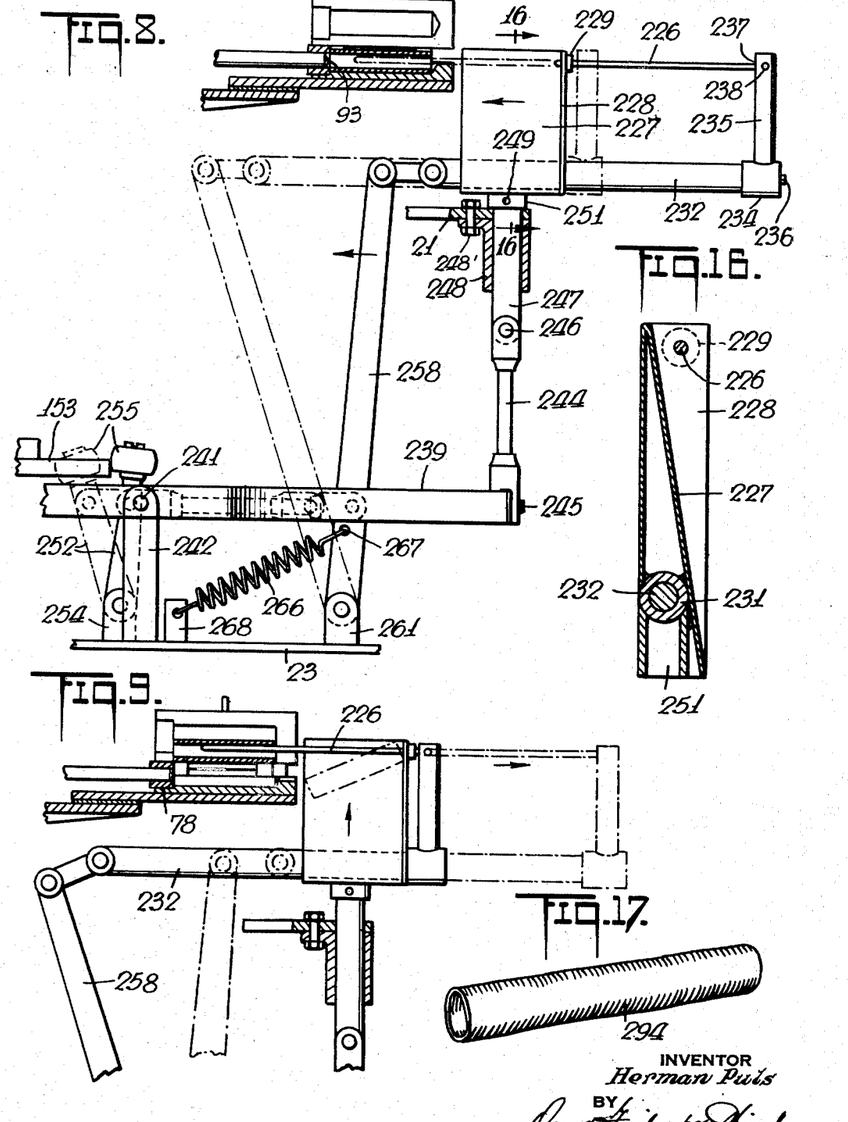
Fig. 9 is a view similar to Fig. 8, showing the tube removing mechanism in raised position.
Fig. 16 is a sectional view on a larger scale taken along line 16—16 of Fig. 8.
Fig. 17 is a perspective view of the baked tube product of the machine.
Figure 10:
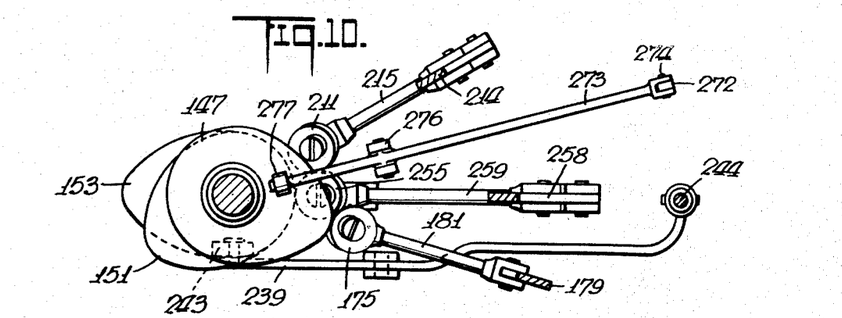
Fig. 10 is a view in transverse cross-section, taken along line 10—10 of Fig. 3.

To carry the pin, a plate 227 is provided, tilted from the vertical as shown in Fig. 16. The plate on one edge thereof has a flange 228 with an outwardly extending bushing bearing 229 affixed thereto near the top thereof, through which bearing said pin extends. The lower end of the plate has a bushing bearing 231 extending transversely thereacross in which is positioned a rod 232 having a hub 234 rigidly affixed thereto at one end thereof. Hub 234 has a vertical rod 235 affixed in an opening therein by a set screw 236, the upper end of said rod 235 having an opening 237 therethrough in which is inserted one end of pin 226, securely retained therein by set screw 238.

To reciprocate horizontal pin 226, a transmission is provided actuated by cam 153. This transmission comprises a substantially upright lever 252 pivoted at its lower end 253 to a bracket 254 affixed to base 23 and having a roller 255 at its upper end in engagement with cam 153. Lever 252 is connected to a substantially upright lever 258 by means of a pitman 259 pivoted at its ends as at 256 and 257 to the respective levers. Lever 258 is pivoted at its lower end to a bracket 261 affixed to base 23 and its upper end protrudes through a slot 262 in bed 21 and is pivotally connected to rod 232 by means of a pitman 265 pivoted at its ends as at 263 and 264 to lever 258 and rod 232, the pivotal connection of pitman 265 thus permitting the horizontal pin 226 to be moved vertically and horizontally.

By means of a coil spring 266 affixed at one end to lever 258 as at 267 and anchored to base 23 as at 268, roller 255 is maintained in constant engagement with cam 153 so that lever 252 follows the latter.

To move horizontal pin 226 vertically, a transmission is provided actuated by cam 155 beneath cam 153. This transmission comprises a substantially horizontal lever 239 pivoted near its midsection as at 241 on a bracket 242 affixed to base 23. One end of lever 239 adjacent cam 155 has a roller 243 thereon in engagement with the face of cam 155. The free end of lever 239 has a pitman 244 pivotally connected thereto as at 245, the upper end of the pitman being pivotally connected as at 246 to a vertical plunger rod 247 slidably mounted in a bushing 248 affixed beneath bed 21 by bolt 248'. The upper end of rod 247 is securely affixed by set screw 249 to a hub 251 affixed to bushing 231 on plate 227 as by welding or the like.

Operation

To facilitate a clear understanding of the operation of the specific embodiment of the machine herein shown, the movement of one of the molds, designated by the letter M, through a complete baking cycle will be followed from the initial charging of an empty mold with dough to the removal of the baked tube from such mold. As motor M through transmission 63, drives the gears in reduction gear box 64, the coacting bevel gears 65 and 66 will rotate drive shaft 44 together with sprocket wheel 139 and disk 56 affixed thereto.

As disk 56 rotates, the upright pin 57 thereon will engage one of the twenty-four notches 62 in drive plate 59 at each complete revolution of disk 56, thereby stepping drive plate 59 through 15 degrees to one twenty-fourth of a revolution. Thus, shaft 27 to which drive plate 59 is affixed will also move one twenty-fourth of a revolution as will table 37 to which molds 72 are affixed. It is apparent, therefore, that it will require twenty-four step-by-step movements of table 37 for each mold thereon to make one complete revolution through the baking cycle heretofore described.

As sprocket wheel 139 rotates, it will rotate sprocket wheel 142 by means of sprocket chain 147, thereby driving cam shaft or sleeve 144 and the cams thereon. It is to be noted that while drive plate 59 is intermittently stepped through a complete revolution, sleeve 144 will be continuously rotating. The timing of the cam shaft and the drive plate is so arranged that the cam shaft will make nearly a complete revolution after each stepped movement of the drive plate to give a dwell period for the table so that the operations performed at each station can occur.

As shown in Fig. 2, when the stepped movement of table 37 has moved the opened mold M to position A, it will be recharged with dough or batter from the supply tank 271. To this end, cam 149 on the upper surface of cam 147 contacts roller 277 on lever 273 to pivot the latter and force piston rod 272 into pump 269, thereby forcing a charge of batter through outlet 299 and the fish-tail nozzle 291 thereof, so that a strip of batter will be delivered into the mold.

As cam 149 is relatively small and steep, the piston rod 272 will be given a rapid push to insure injection of batter into the mold. Once roller 277 has passed over cam 149, spring 278 will quickly pivot lever 273 for the suction stroke of the pump to recharge the latter for the next cycle. The slight suction resulting from the rapid pulling up of the piston rod will prevent any leakage or drip from nozzle 291.

The next stepped movement of table 37 will move the mold M from station A to station B. In the movement from station A to station B, pin 106 will engage finger 138 of arm 137 to close cover 83 of the open mold. The upstanding portion 99 of latch arm 96 will next engage the beveled end 131 of cam arm 129 to be cammed inward so that hook 101 of the latch arm engages the stud 102 to lock the mold.

In station B, roller 211 on lever 207' is against the low portion 151' of cam 151, spring 223 retaining arm 199 in extended position with finger 202 thereof always behind face 116 of collar 94.

As cam 151 rotates, its high point 207 will pivot lever 207' and through pitman 215, lever 214, pitman 222, rod 196 and arm 199 will bring finger 202 to abut against face 116 of collar 94 and then move plunger rod 87 into the batter in the mold to form a tube therein, the tapered end 93 of the plunger rod being seated in the tapered ends 77 and 77' of the mold. The plunger rod is securely retained in the mold by the locking action of latch 112 against collar 94 in the manner heretofore described. Continued rotation of cam 151 will cause coil spring 223 through the transmission above set forth to move arm 199 back to its original position for the succeeding molds.

The next stepped movement of table 37 will move the mold from station B and succeeding stepped movements of the table 37 will cause the mold M to completely traverse the oven 107 until it emerges therefrom and arrives at station C.

As mold M moves one step from station C to station D, the beveled edge 125 of bracket 123 will engage the protruding end 99 of latch arm 96 to cam the latter away from hook 101, thereby unlocking the mold.

In station D, the finger 166 of L-shaped arm 164 will always be positioned directly in front of face 168 of collar 94 on the plunger rod 87 extending as a core in the mold.

At this time, cam 147 which actuates arm 164 has its high portion 147' against roller 175 on lever 172, thereby normally retaining arm 164 in retracted position. As cam 147 rotates and moves lever 172 inwardly, coil spring 188 will pivot lever 179, thereby sliding rod 161 in its bearings to push finger 166 on arm 164 toward collar 94.

Before finger 166 contacts collar 94, cam piece 169 thereon will contact pin 171 on latch 112 to disengage hook 115 thereof from collar 94 to unlock the core. Continued movement of arm 164 will force finger 166 against collar 94 to withdraw plunger rod 87 from the mold.

Continued rotation of cam 147 to its original position will restore arm 164 to its original position so that finger 166 will be ready to withdraw the plunger rod from the succeeding mold.

The next stepped movement of table 37 will move mold M from station D to station E. During the course of this movement, pin 106 on cover 83 will ride up cam surface 134, thereby opening the mold as shown in Figs. 12 and 13.

In station E, cam 153 will rotate so that the low portion 153' of the cam will be against roller 255 of lever 252. As lever 252 follows cam 153 and is moved inwardly, coil spring 266 will pivot lever 258, thereby sliding rod 232 in bushing 231 to move pin 226 into the bore of the baked tube in the mold.

It is to be noted at this point that by reason of the tapered ends 77 and 77' of the depressions 76 and 84 in the mold and the corresponding tapered end 93 of plunger rod 87, the end of the baked tube 294 into which pin 226 is inserted, will be open, thus enabling the pin to slide freely into the bore of the tube. If not for this feature, the force of the pin abutting against the closed end of the tube might cause the latter to shatter.

When the pin 226 has entered tube 294, face cam 155 will thereupon engage roller 243 on lever 239 to pivot the free end of the latter upwardly, thereby lifting rod 247 and with it plate 227 on which pin 226 is mounted, and with it baked tube 294 to remove it from the open mold. Continued rotation of cam 153 to its original position will again move its high portion $153^2$ against roller 255 of lever 252. Through the transmission from the lever 252 to pin 226, the latter will be moved outwardly through bushing 229. As this occurs, the end of tube 294 will abut against the bushing 229 and as the pin is completely withdrawn from the bore of tube 294, the latter will be released to slide down inclined plate 227 into a suitable receptacle therefor (not shown).

The continued rotation of cam 153 will move face cam 155 away from roller 243 so that the free end of lever 239 will be lowered, to lower plate 227 and pin 226 thereon so that it is ready for the next mold.

The next stepped movement of table 37 will move mold M to position A, whereupon the cycle will be repeated.

It is of course to be understood that consecutive molds will be at consecutive stages of advancement through a baking cycle so that with each complete revolution of the table 37, twenty-four baked tubes will be completed by the machine.

Inasmuch as the gas outlets 110 of the oven do not heat the molds when the latter are at the operating stations, they would tend to cool. Thus as the baked tube is removed from the mold at station E, the tube might stick thereto. This sticking might also occur if, when the batter was injected into the mold in position A, the mold had cooled.

To keep the molds heated, a gas pipe 295 is provided having outlets 296 and 297 aligned with stations E and A. As the molds are open in these two positions, the flames from the outlets are preferably directed against the bushing ends of the molds and the plunger rod 87, as shown in Fig. 2, and not over the open segments thereof. The heat applied is sufficient to keep the mold contents from sticking.

Although the embodiment of the machine herein shown to illustrate my invention has twenty-four molds thereon, it is to be understood that the machine could be constructed for a greater or lesser number of molds.

The machine herein can operate for many hours without supervision, requiring as it does only an adequate supply of dough. If any of the molds should require repairs or cleaning, it is a relatively simple matter to replace it with a new unit, thus reducing the lay-up time of the machine.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A machine of the character described comprising a frame, a table, means rotatably mounting said table on said frame, a plurality of separable molds affixed to said table, each of said molds comprising a base and a cover hinged thereto and movable into open and closed position, a plunger rod for each of said molds to form a tube therein, and slidably mounted on said table, a motor, an oven, means actuated by said motor for intermittently stepping said table through a complete revolution, means actuated by said motor successively to move said plunger rods into said molds, means actuated by said motor successively to move said plunger rods out of said molds, means releasably to retain said plunger rods in said molds, means actuated by the means to move the plunger rods out of said molds to release said plunger rod retaining means, means for pivoting said cover about said hinge successively to open said molds as said table rotates, means for pivoting said cover about said hinge successively to close said molds as said table rotates, locking means for said molds, means actuated by said motor for successively charging said molds after said plunger rods have been removed therefrom and said molds have been opened, means for successively removing the contents of said molds after the intermittent movement of said table has passed them through said oven, and after the plunger rod has been removed therefrom and said molds have been opened by said aforementioned means.

2. The combination set forth in claim 1 in which the means releasably to retain said plunger rod in its associated mold comprises a collar affixed to said plunger rod, and a latch pivoted on said table in juxtaposition to said mold, said latch having a hook thereon resiliently urged toward said plunger rod, whereby when the latter is in the mold, said hook will engage said collar thereby preventing withdrawal of said plunger rod until said hook is released.

3. The combination set forth in claim 1 in which the means to remove the contents of said mold comprises a substantially upright plate, means affixed to said frame to lift said plate, a pin slidably mounted on said plate transversely thereacross, radially aligned with said molds and in juxtaposition to the periphery of said table, means affixed to said frame to reciprocate said pin, whereby when said pin is moved toward said opened mold, it will enter said tube therein, when said plate is lifted, said pin will lift said tube from said mold, and means when said pin is moved away from said mold, to remove said tube from said pin.

4. The combination set forth in claim 1 in which the means actuated by said motor to move said plunger rod out of said mold comprises a collar on said plunger rod, a substantially L-shaped arm having a finger in juxtaposition to the inner face of said collar, a transmission from said motor to said arm to reciprocate the latter whereby the finger on said arm abuts against said inner face of said collar to slide said plunger rod out of said mold.

5. The combination set forth in claim 1 in which the means actuated by said motor to move said plunger rod into said mold comprises a collar on said plunger rod, a substantially L-shaped arm having a finger in juxtaposition to the outer face of said collar, a transmission from said motor to said arm to reciprocate the latter, whereby the finger on said arm will abut against said outer face of said collar to slide said plunger rod into said mold.

6. The combination set forth in claim 1 in which said locking means comprises a latch arm affixed to the base of said mold and pivoted thereon and a stud rigid with said cover, said latch arm having a hook thereon adapted to coact with said stud when said mold is closed securely to retain said cover on said base.

7. The combination set forth in claim 1 in which the means for pivoting said cover about said hinge to open said mold as said support means rotates, comprises a pin rigid with said cover and extending therefrom, and a bracket affixed to said frame and having an inclined cam surface in the path of said pin on said closed mold whereby, as said support means rotates, said pin will ride up said cam surface to pivot said cover about its hinge to open said mold.

8. The combination set forth in claim 1 in which the means for pivoting said cover about said hinge to close said open mold as said support means rotates, comprises a pin rigid with said cover and extending therefrom, and a bracket affixed to said frame and having a member thereon protruding in the path of movement of said pin on said open mold, whereby as said support means rotates, said pin will abut against said extending members to pivot said cover about its hinge to close said mold.

9. The combination set forth in claim 1 in which the means for actuating said locking means to unlock the latter comprises a bracket affixed to said frame and having a beveled edge in the path of movement of said latch arm, said latch arm having an upwardly protruding portion rigid therewith, whereby, as said table rotates, said beveled portion will engage said upwardly protruding portion to cam said latch arm about the pivot, thereby releasing said hook from said stud.

10. The combination set forth in claim 1 in which the means for actuating said locking means to lock the latter comprises a bracket affixed to said frame and having a beveled edge in the path of movement of said latch arm, said latch arm having an upwardly protruding portion rigid therewith, whereby as said table rotates, said beveled portion will engage said upwardly protruding portion to cam said latch arm about its pivot, thereby moving said hook to engage said stud.

11. A machine of the character described comprising a mold, a plunger rod for said mold to form a tube therein and slidably mounted with respect to said mold, means to move said plunger rod into said mold and means releasably to retain said plunger rod in said mold, said means comprising a collar affixed to said plunger rod and a latch pivotally mounted in juxtaposition to said mold, said latch having a hook thereon resiliently urged toward said plunger rod and normally engaging said collar when the plunger rod is in said mold, thereby preventing withdrawal of said plunger rod until said hook is released.

12. A machine of the character described comprising a mold, a plunger rod for said mold to form a tube therein and slidably mounted with respect to said mold and means to move said plunger rod into said mold, said means comprising a collar on said plunger rod, a substantially L-shaped arm having a finger in juxtaposition to the outer face of said collar and a transmission to actuate said arm to move said finger against the outer face of said collar to slide said plunger rod into said mold.

13. A machine of the character described comprising a mold, a plunger rod for said mold to form a tube therein and slidably mounted with respect to said mold and means to move said plunger rod out of said mold, said means comprising a collar on said plunger rod, a substantially L-shaped arm having a finger in juxtaposition to the inner face of said collar and a transmission to actuate said arm to move said finger against the inner face of said collar to slide said plunger rod out of said mold.

14. A machine of the character described comprising a mold, a plunger rod for said mold to form a tube therein and slidably mounted with respect to said mold, means releasably to retain said plunger rod in said mold, said means comprising a collar affixed to said plunger rod and a latch pivotally mounted in juxtaposition to said mold, said latch having a hook thereon resiliently urged toward said plunger rod and normally engaging said collar when the plunger rod is in said mold thereby preventing withdrawal of said plunger rod and means to move said plunger rod out of said mold, said means comprising a substantially L-shaped arm having a finger in juxtaposition to the inner face of said collar and a cam piece associated with said finger, said latch having an upstanding projection in the path of movement of said cam piece, and a transmission to actuate said arm to move said cam piece against said projection to pivot said latch and the hook thereon away from said collar to release the latter and to move said finger against the inner face of said collar to slide said plunger out of said mold.

15. A machine of the character described comprising a mold for forming tubes, said mold having a base and a cover hinged thereto and movable into open and closed position, means to open said mold and means to remove the contents of said mold, said means comprising a substantially upright plate, means to lift said plate, a pin slidably mounted on said plate transversely thereacross, longitudinally aligned with said mold and normally spaced therefrom, means to reciprocate said pin to move the latter toward said opened mold, whereby when said pin enters the tube in said mold and the plate is lifted the pin will lift the tube from said mold and means when said pin is moved away from said mold to remove the tube from said pin.

HERMAN PULS.

REFERENCES CITED

The following references are of record in the file of this patent:

UNITED STATES PATENTS

| Number | Name | Date |
|---|---|---|
| 1,119,918 | Winder | Dec. 8, 1914 |
| 1,162,751 | Clinton | Dec. 7, 1915 |
| 1,170,720 | Winder | Feb. 8, 1916 |
| 1,209,939 | Costigan et al. | Dec. 26, 1916 |
| 1,289,209 | Lewison | Dec. 31, 1918 |
| 1,302,733 | Turnbull | May 6, 1919 |
| 1,356,870 | Maeda | Oct. 26, 1920 |
| 1,375,609 | Roberts | Apr. 19, 1921 |
| 1,719,931 | Hall | July 9, 1929 |
| 1,967,933 | Hall | July 24, 1934 |